(12) United States Patent
Lepold

(10) Patent No.: US 11,998,869 B2
(45) Date of Patent: Jun. 4, 2024

(54) FILTER ELEMENT

(71) Applicant: Sprintus GmbH, Welzheim-Breitenfürst (DE)

(72) Inventor: Holger Lepold, Rudersberg (DE)

(73) Assignee: Sprintus GmbH, Welzheim-Breitenfürst (DE)

( * ) Notice: Subject to any disclaimer, the term of this patent is extended or adjusted under 35 U.S.C. 154(b) by 116 days.

(21) Appl. No.: 16/853,993

(22) Filed: Apr. 21, 2020

(65) Prior Publication Data
US 2020/0338489 A1 Oct. 29, 2020

(30) Foreign Application Priority Data

Apr. 25, 2019 (EP) .................................... 19171006

(51) Int. Cl.
*B01D 46/00* (2022.01)
*B01D 46/68* (2022.01)
(Continued)

(52) U.S. Cl.
CPC ............. *B01D 46/86* (2022.01); *B01D 46/68* (2022.01); *A47L 9/10* (2013.01); *A47L 9/14* (2013.01);
(Continued)

(58) Field of Classification Search
CPC . A47L 9/00; A47L 9/10–149; B01D 46/0083; B01D 46/0064; B01D 46/0005;
(Continued)

(56) References Cited

U.S. PATENT DOCUMENTS 2,731,102 A * 1/1956 James ...................... B04C 5/06
55/321
4,227,893 A * 10/1980 Shaddock ................. B60P 1/60
55/315
(Continued)

FOREIGN PATENT DOCUMENTS

CN 2617459 Y 5/2004
CN 202801480 U 3/2013
(Continued)

OTHER PUBLICATIONS

Chinese Search Report, 2020103338301, Apr. 24, 2021.
European Search Report, EP19171006.0, Jul. 22, 2019.

*Primary Examiner* — T. Bennett McKenzie
(74) *Attorney, Agent, or Firm* — FRESH IP PLC

(57) ABSTRACT

The subject matter of the invention is a filter element (13) for insertion into a vacuum cleaner, with an upper side (14), a lower side (15) which lies opposite the upper side (14), a filter body (19) which extends from the upper side (14) to the lower side (15) and which forms a wall (26) of a clean air space which is situated between the upper side and the lower side, and with a conveying opening (17) which is arranged on the upper side (14), opens into the clean air space, and through which an air flow which is driven by way of the vacuum cleaner can be conveyed. According to the invention, a deflecting surface (20) which extends in the direction of the lower side (15) is arranged in the clean air space below the conveying opening (17), which deflecting surface (20) is configured to deflect an air flow which is introduced through the conveying opening (17) in the direction of the wall (26) of the clean air space. The filter element (13) according to the invention can be relieved of filter cakes in a simple and effective way.

12 Claims, 2 Drawing Sheets

(51) Int. Cl.
  *B01D 46/86* (2022.01)
  *A47L 9/10* (2006.01)
  *A47L 9/14* (2006.01)

(52) U.S. Cl.
  CPC ......... *A47L 9/1463* (2013.01); *B01D 46/0005* (2013.01); *B01D 2221/02* (2013.01); *B01D 2221/16* (2013.01)

(58) Field of Classification Search
  CPC ............ B01D 2221/02; B01D 2221/16; B01D 46/0043; B01D 46/66–78; B01D 46/86
  USPC .................. 55/462–465, 282–305, 361–382; 15/1–268
  See application file for complete search history.

(56) References Cited

U.S. PATENT DOCUMENTS

| | | | | |
|---|---|---|---|---|
| 4,904,384 A | * | 2/1990 | Potz | B01D 29/66 210/309 |
| 5,580,361 A | * | 12/1996 | Ferges | C10J 3/84 48/128 |
| 5,845,782 A | * | 12/1998 | Depew | B01D 50/20 209/148 |
| 6,440,191 B1 | * | 8/2002 | Berfield | A47L 5/365 15/353 |
| 6,488,744 B2 | * | 12/2002 | Cartellone | A47L 9/125 55/DIG. 3 |
| 6,569,217 B1 | * | 5/2003 | DeMarco | B01D 50/20 96/380 |
| 7,754,069 B2 | * | 7/2010 | Shoji | B01D 29/902 210/90 |
| 7,833,304 B2 | * | 11/2010 | Pearson | B01D 46/0045 55/418 |
| 7,842,112 B2 | * | 11/2010 | Lee | A47L 9/1658 55/343 |
| 2004/0163207 A1 | * | 8/2004 | Oh | A47L 9/1666 15/353 |
| 2007/0169450 A1 | * | 7/2007 | Bergami | B01D 46/2414 55/498 |
| 2007/0209150 A1 | * | 9/2007 | Gogel | A47L 9/19 15/352 |
| 2009/0031525 A1 | * | 2/2009 | Makarov | A47L 9/1625 15/347 |
| 2010/0031616 A1 | * | 2/2010 | Gillingham | B01D 46/52 55/357 |
| 2010/0132153 A1 | * | 6/2010 | Leibold | B01D 46/521 55/294 |
| 2013/0192467 A1 | * | 8/2013 | Lyras | B01D 46/02 55/385.2 |
| 2014/0096683 A1 | * | 4/2014 | Azwell | B01D 46/0049 95/268 |
| 2015/0174518 A1 | * | 6/2015 | Caesar | B01D 46/0049 55/341.2 |
| 2015/0306532 A1 | * | 10/2015 | Handte | B01D 46/2403 55/284 |
| 2015/0343361 A1 | * | 12/2015 | Holzmann | B01D 46/69 95/278 |
| 2017/0071426 A1 | | 3/2017 | Krebs et al. | |
| 2021/0322913 A1 | * | 10/2021 | Gentile | F02M 35/02475 |

FOREIGN PATENT DOCUMENTS

| | | |
|---|---|---|
| CN | 203790747 U | 8/2014 |
| CN | 106963286 A | 7/2017 |
| CN | 206910976 U | 1/2018 |
| DE | 10 2010 004714 A1 | 7/2011 |
| EP | 2 952 242 A1 | 12/2015 |
| GB | 1024249 | 3/1966 |
| GB | 1024249 * | 3/1986 |
| WO | WO 2011/086016 A1 | 7/2011 |

* cited by examiner

FILTER ELEMENT

FIELD OF THE INVENTION

The subject matter of the invention is a filter element for insertion into a vacuum cleaner. The filter element comprises an upper side, a lower side which lies opposite the upper side, and a filter body which extends from the upper side to the lower side and forms a wall of a clean air space which is situated between the upper side and the lower side. A conveying opening which opens into the clean air space is arranged on the upper side, through which conveying opening an air flow which is driven by way of the vacuum cleaner can be conveyed.

BACKGROUND OF THE INVENTION

A filter element of this type is known, for example, from DE 10 2010 004 714 A1. The filter element can be inserted into a vacuum cleaner in such a way that the conveying opening is connected in a substantially fluid-tight manner to a conveying connector of the vacuum cleaner. Via the conveying connector, an air flow can be generated with the aid of a usually present vacuum cleaner fan, which air flow can be conveyed in a known way, for example, starting from a suction nozzle of the vacuum cleaner via a suction hose into a housing. Within the housing, the air flow is conducted through the at least partially air-permeable filter body into the inner clean air space of the filter element and from there via the conveying connector to the fan.

Material to be vacuumed which is present in the surrounding area can be entrained by the air flow. The filter body is preferably configured in such a way that the material to be vacuumed does not pass through the wall of the filter body, but rather is separated on it and preferably falls into a collecting container as a result of the action of gravity.

One problem in the case of known filter elements of this type is that the material to be vacuumed adheres at least partially to the wall and thus clogs the filter body in the course of time. The adhering material to be vacuumed is also called a filter cake. The volumetric flow which can be conveyed through the filter body and the accompanying vacuum performance are reduced by way of the filter cake.

In order to detach the filter cake from the filter body, it is known from the prior art to operate the vacuum cleaner in what is known as flushing operation, in which the conveying direction of the air flow runs through the filter body in a reversed manner. The air flow is then conveyed, starting from a region outside the vacuum cleaner, through the conveying opening into the clean air space and subsequently to the outside through the filter body. When passing through the filter body, the air flow entrains material to be vacuumed which adheres to the outer side of the filter body, and cleans the filter body in this way. In order to improve the cleaning action, the air flow can also be conveyed intermittently via the conveying opening into the air space.

It is a disadvantage of the known prior art that the air which is already situated within the clean air space exerts an undesired damping effect on the incoming air flow. As a result, the momentum of the air flow is weakened up to the filter element being reached. Said damping action is particularly pronounced in the lower region of the filter element, with the result that, in particular, the lower region of the filter element frequently cannot be cleaned sufficiently of the filter cake. The insufficient cleaning leads to a reduced vacuum performance.

SUMMARY OF THE INVENTION

On the basis of this prior art, it is the object of the present invention to provide a filter element which can be cleaned better and more thoroughly from the filter cake. Said object is achieved by a filter element as disclosed herein. According to the invention, a deflecting surface which extends in the direction of the lower side of the filter element is arranged in the clean air space below the conveying opening. The deflecting surface is configured to deflect an air flow which is introduced through the conveying opening in the direction of the wall of the clean air space.

By deflecting an air flow in the direction of the wall, the deflecting surface according to the invention significantly reduces the volume which the air flow has to pass before impinging on the filter body. As a result, in particular in the lower region of the filter element, the air flow can be conducted deliberately and on a direct path to the filter body. As a result, the air which is situated in the clean air space is damped to a considerably lesser extent in flushing operation, in particular in the lower region of the filter element, before it impinges on the filter body. It can be ensured as a result that, in the case of the cleaning of the filter element, the air flow impinges on the wall with a considerably greater momentum.

The deflecting surface preferably extends from the upper side as far as the lower side of the filter element. In this case, the deflecting effect according to the invention emerges over the entire height of the filter element, which increases the cleaning effectiveness.

The deflecting surface preferably forms a lower boundary of the clean air space. In particular, the deflecting surface can form a substantially fluid-tight lower boundary of the clean air space. It is ensured in this case that the air flow cannot pass the deflecting surface downward in flushing operation, but rather is deflected completely by the deflecting surface in the direction of the wall. The volume of the clean air space is reduced in an effective manner by way of the deflecting surface, with the result that an air flow which is introduced through the conveying opening for cleaning purposes is deflected directly in the direction of the filter body.

Within the context of the invention, it has been ascertained that the influence of the air compression which has a disadvantageous effect on the cleaning increases during the movement of the air flow from top to bottom through the filter element. In particular, a lower region of the filter body, which lower region is further away from the conveying opening, is therefore cleaned to a lesser extent than an upper region which is situated in the vicinity of the conveying opening. The deflecting surface can therefore preferably be at a spacing from the wall of the clean air space, which spacing is greater in the region of an upper section of the deflecting surface than in the region of a lower section of the deflecting surface. The spacing which is smaller in the lower region can ensure that the air flow there retains a momentum which is sufficiently great to release the filter cake. In one preferred embodiment, the spacing can decrease from the upper side toward the lower side. In particular, it is advantageous if the spacing decreases continuously from the upper side toward the lower side. Here, the spacing denotes the distance of a section of the deflecting surface, which section is situated at a defined height of the filter element, from that side of the wall of the clean air space which faces said section, that is to say is impinged on by the deflected air flow. Here, the spacing is measured in the horizontal direction. If different sections of the deflecting surface are at different spacings from the wall at a defined height, the spacing can be formed by way of a mean spacing of said different sections from the wall.

The deflecting surface can fundamentally have any desired shape. For example, the deflecting surface can have a curved shape or can be configured as a planar face.

In one embodiment, the deflecting surface can enclose an angle with a vertical axis of the filter element, which angle lies between 20° and 70°, preferably between 30° and 60°, and further preferably between 40° and 50°. The vertical axis runs from the upper side to the lower side. In flushing operation, the air flow is usually introduced into the clean air space along the vertical axis. Said angular ranges ensure an effective deflection of the air flow.

In one preferred embodiment, the deflecting surface is configured to divide the clean air space into a plurality of subspaces which are separated from one another. In particular, the deflecting surface can be configured to divide the clean air space into two subspaces which are separated from one another. The subspaces are preferably separated from one another in a substantially fluid-tight manner, with the result that preferably no direct air exchange can take place between the subspaces which are separated from one another. By way of the division of the clean air space, the volume of the clean air space is reduced in an effective way, and the cleaning action is thus improved.

The wall of the clean air space is preferably of substantially cylindrical configuration. Furthermore, the filter element can have a supporting frame for holding the filter body, it being possible for the deflecting surface to be connected to the supporting frame. The supporting frame can have a top element which forms the upper side and in which the conveying opening is arranged, and a bottom element which forms the lower side, the top element and the bottom element preferably being connected to one another by way of a wall element. In one preferred embodiment, the deflecting surface is connected at its upper end to the top element. The deflecting surface can be connected at its lower end to the wall element and/or to the bottom element. A particularly stable filter element can be formed by way of said features.

The subject matter of the invention is also a vacuum cleaner, into which a filter element according to the invention is inserted. In one preferred embodiment, in which the deflecting surface is configured to divide the clean air space into a plurality of and preferably into two subspaces which are separated from one another in a substantially fluid-tight manner, the vacuum cleaner has at least two conveying ducts which can be switched independently of one another into suction operation or into flushing operation. The first conveying duct is preferably connected to a first one of the subspaces, and the second conveying duct is connected to another one of the subspaces. By way of said refinement, for example, flushing operation can be carried out via the first subspace, and at the same time suction operation can be carried out via the other subspace.

Further advantages and refinements of the invention result from the the description and the appended drawing.

It goes without saying that the features which are mentioned in the above text and those which are still to be described in the following text can be used not only in the respectively specified combination, but rather also in other combinations or on their own, without departing from the scope of the present invention.

BRIEF DESCRIPTION OF THE INVENTION

The invention is shown diagrammatically in the drawings on the basis of one exemplary embodiment, and will be described in detail in the following text with reference to the drawings, in which.

DETAILED DESCRIPTION OF THE INVENTION

Figure 1:
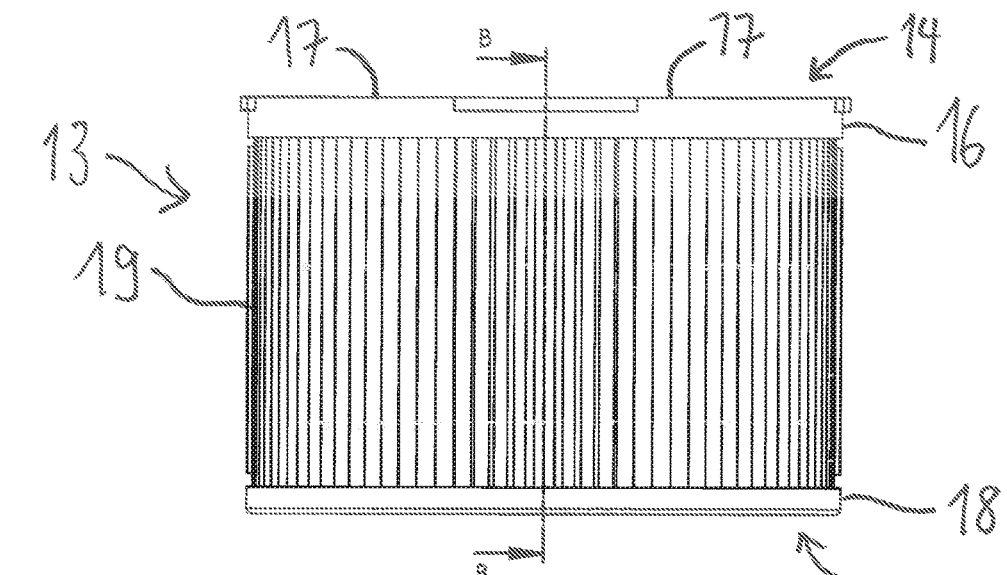
FIG. 1 shows a side view of a filter element according to the invention.

FIG. 1 shows a side view of a filter element 13 according to the invention. The filter element 13 has an upper side 14 and a lower side 15. A top element 16 is situated on the upper side 14, in which top element 16 a conveying opening 17 is arranged. A bottom element 18 is situated on the lower side 15. Moreover, the filter element 13 has a filter body 19 which connects the bottom element 18 to the top element 16. A clean air space which is situated in an interior of the filter element 13 is enclosed by way of the bottom element 18, the top element 16 and the filter body 19. The conveying opening 17 opens into the clean air space. The filter element 19 forms a wall 26 of the clean air space (see FIG. 3), which wall 26 is at least partially air-permeable.

A conveying connector (not shown in the figures) of a vacuum cleaner can be connected to the conveying opening 17, in order to convey an air flow through the conveying opening 17. In suction operation of the vacuum cleaner, the air flow is conducted from outside through the at least partially air-permeable filter body 19 into the clean air space. Here, material to be vacuumed which is entrained by the air flow is separated on the outside of the wall 26 of the filter body 19, as a result of which the air is cleaned. The cleaned air then passes upward through the conveying opening 17 out of the clean air space.

In the course of time, material to be vacuumed which adheres to the outer side of the wall 26 and is also called a filter cake accumulates. The filter cake reduces the vacuum performance and therefore has to be removed regularly from the outer side of the wall 26. To this end, the vacuum cleaner can be set into flushing operation, in which the air flow flows in the reversed direction from above through the conveying opening into the clean air space.

Figure 2:
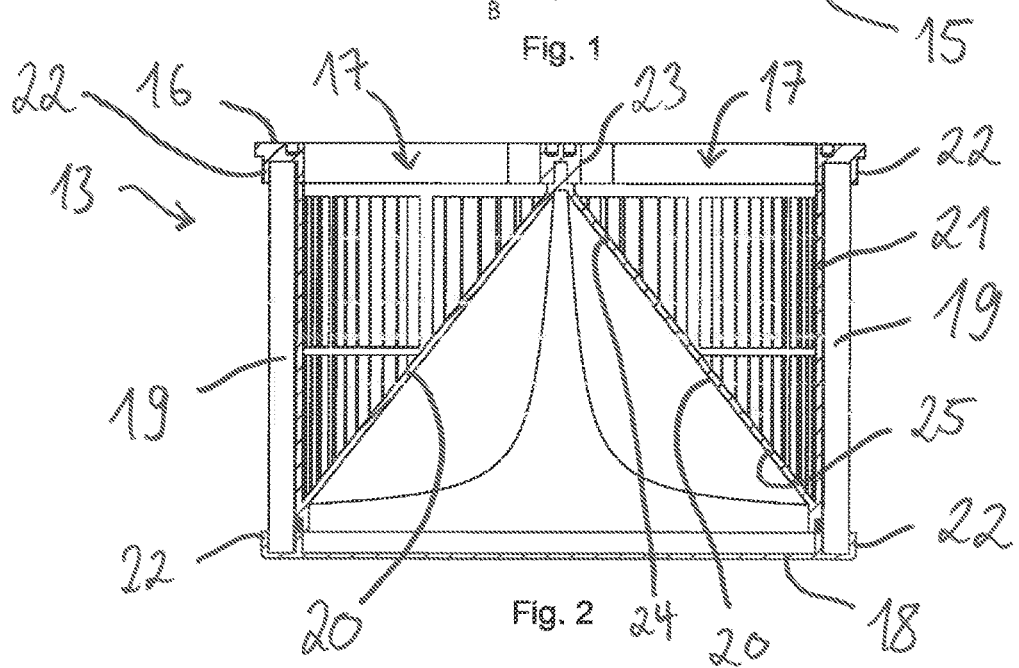
FIG. 2 shows a vertical sectional view along the line B-B which is shown in FIG. 1.
Figure 3:
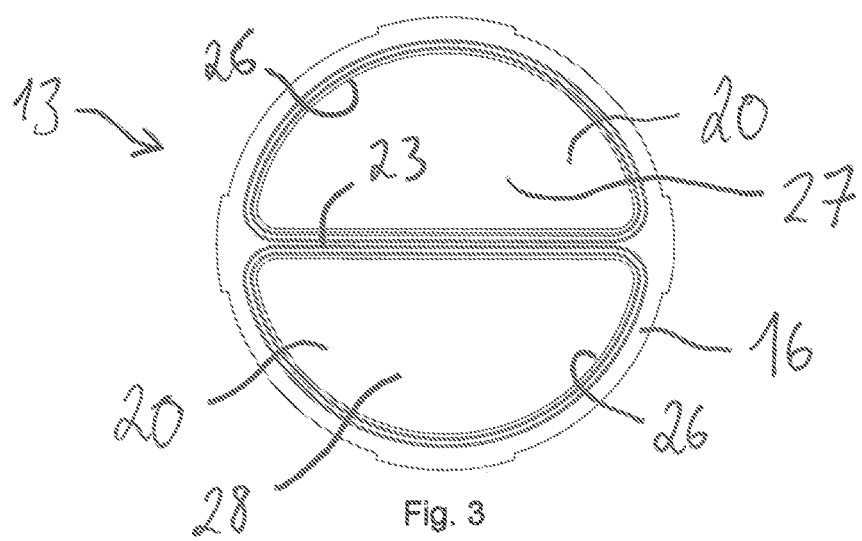
FIG. 3 shows a plan view of the filter element from FIG. 1.

FIG. 2 shows a sectional view along the line B-B which is shown in FIG. 1. In addition to the sectional edges which lie in the sectional plane, the view additionally also shows contours of the filter body 19 which lie outside the sectional plane. FIG. 3 shows a plan view of the filter element according to the invention from FIGS. 1 and 2.

It can be seen in FIG. 2 that the filter element 13 has a supporting frame which comprises the bottom element 18, the top element 16, a wall element 21, a beam element 23 and two deflecting surfaces 20 according to the invention. In the present exemplary embodiment, the supporting frame is configured in one piece, it being possible for a person skilled in the art to easily recognize that a multiple-piece configuration of the supporting frame can also be realized within the context of the invention.

In each case one holding projection 22 is arranged both on the bottom element 18 and on the top element 16. The filter body 19 is inserted between the holding projections 22 and the outer side of the wall element 21. The wall element 21 has a lattice frame which is formed from a plurality of webs 30 (cannot be seen in FIGS. 1 to 3, but shown in FIGS. 4 and 5), which lattice frame makes it possible for the air flow to be conducted through the filter body 19. A conveying opening which is formed from two part openings 17 is situated on the upper side of the top element 16.

The deflecting surfaces 20 according to the invention are arranged below the conveying openings 17, and are configured in each case for the deflection of an air flow which is introduced through the conveying openings 17 in the vertical direction from above into the clean air space. An upper end 24 of the deflecting surfaces 20 is fastened in each case to the beam element 23. The beam element 23 runs centrally over the cross section of the filter element 13, and is connected on both sides to the top element 16 (see FIG. 3). In interaction with the deflecting surfaces 20, the beam element 23 serves to divide the clean air space into two subspaces and to seal the upper region of the subspaces. A lower end 25 of the deflecting surfaces 20 is connected to a lower end of the wall faces 21.

The deflecting surfaces 20 divide the clean air space which is formed within the filter body into two subspaces 27, 28 which are separated in a substantially fluid-tight manner. Here, "separated in a fluid-tight manner" means that at least no direct air exchange can take place between the subspaces 27, 28. It can be seen in the plan view of FIG. 3 that the two subspaces 27, 28 have a substantially semicircular design. Together, the two subspaces 27, 28 configure a substantially cylindrical wall 26. Here, the deflecting surfaces 20 delimit the respective subspace 27, 28 toward the bottom, with the result that an air flow which enters from above via the conveying opening 17 into the subspaces 27, 28 cannot pass downward past the deflecting surfaces 20, but rather is deflected in the direction of the wall 26 of the respective subspace 27, 28.

The spacing of the deflecting surfaces 20 from that part of the wall 26 which faces the respective deflecting surface 20 decreases continuously from the upper region of the filter element 13 toward the lower region of the filter element 13 (see FIG. 2). In particular, the lower sections 25 of the deflecting surfaces 20 are arranged in the vicinity of the respective part of the wall 26. In this way, effective detaching of the filter cake can be ensured even in the region of the lower side 15 of the filter element 13.

Figure 4:
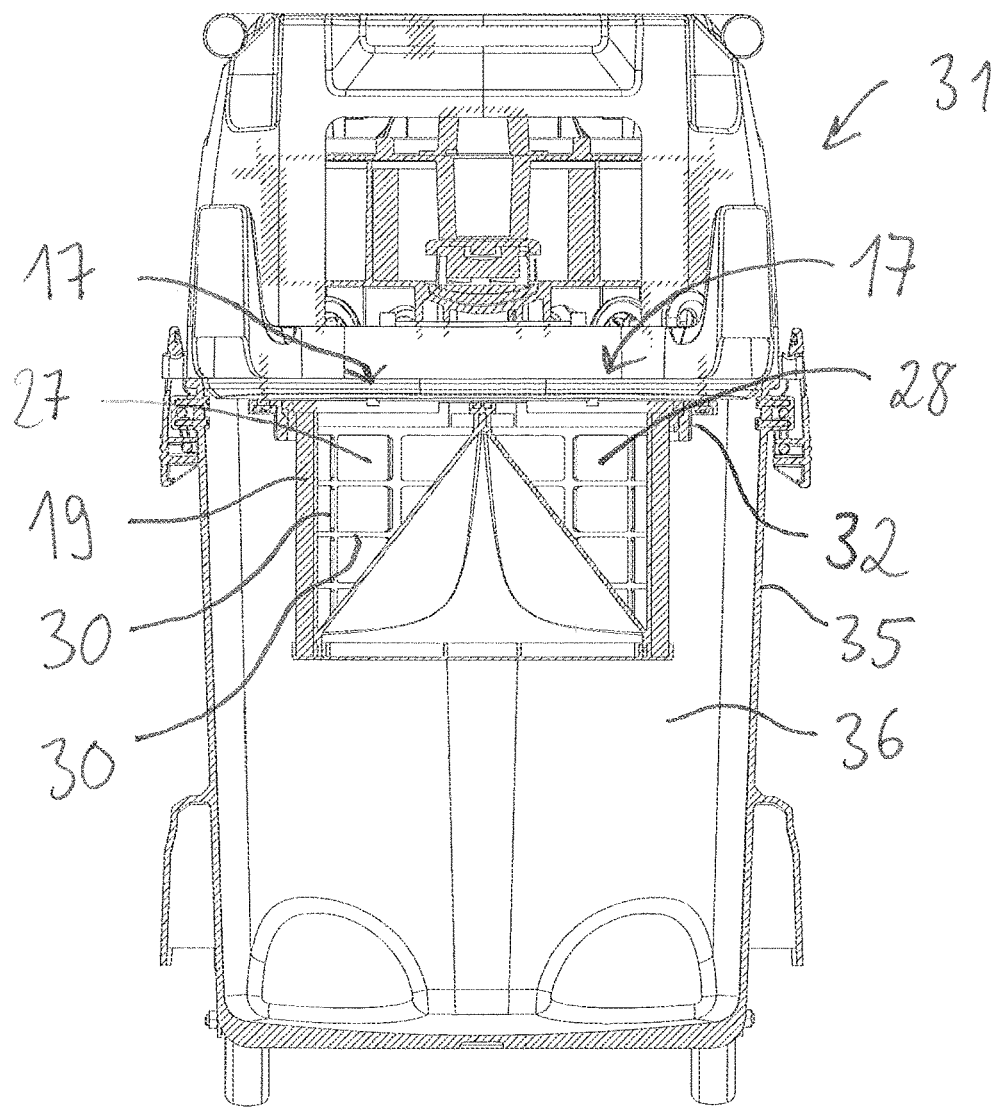
FIG. 4 shows a lateral sectional view of a vacuum cleaner according to the invention, into which a filter element according to the invention is inserted.
Figure 5:
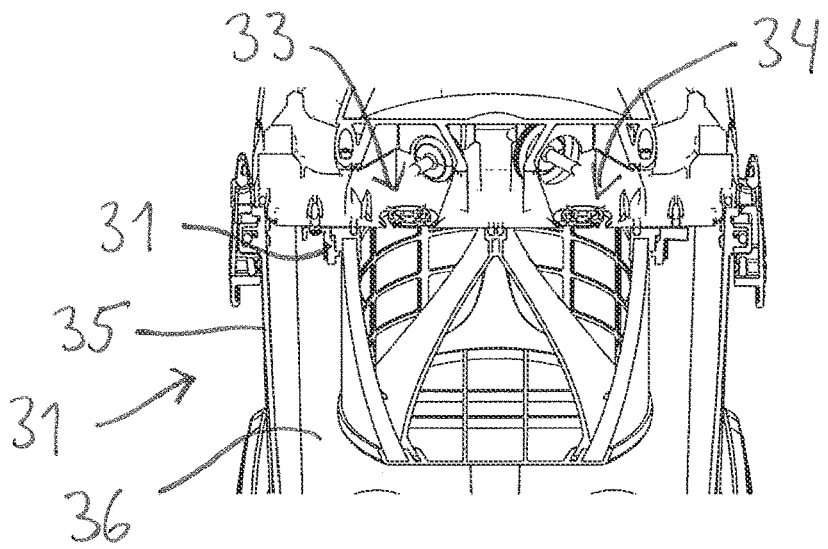
FIG. 5 shows a three-dimensional partially sectioned view of the vacuum cleaner of FIG. 4, only one part of the vacuum cleaner being shown.

FIG. 4 shows a lateral sectional view of a vacuum cleaner according to the invention, into which a filter element according to the invention is inserted. FIG. 5 shows a detail from FIG. 4 in a three-dimensional partially sectioned side view. The webs 30 which together form the wall element 21 of the supporting frame can be seen in the views of FIGS. 4 and 5.

The vacuum cleaner 31 comprises a housing 35 which forms an interior space 36. Clamping jaws 32 are situated in the interior space 36 which interact with the top element 16, in order to clamp the filter element 13 fixedly within the interior space 36. In addition, the vacuum cleaner comprises a conveying fan (not shown in the figures) which serves to generate an air flow.

A suction inlet (cannot be seen in the figures) opens into the interior space 36, via which suction inlet the air flow is conveyed for the introduction of contaminants into the interior space 36 in suction operation. In suction operation, the air flow subsequently enters through the filter body 19 into the clean air space. Here, the contaminants are separated on the outside of the filter body 19, a part of the contaminants falling down under the action of gravity and being collected in the interior space 36, and another part of the contaminants remaining adhering to the outer wall of the filter body 19 and thus forming a filter cake. From the clean air space, the air flow passes via the conveying openings 17 back into the surrounding area of the vacuum cleaner.

In order to detach the filter cake, the direction of the air flow can be reversed as has already been described above, particularly effective cleaning of the filter body taking place in this case by way of the above-described advantageous effects of the deflecting surfaces 20.

Further advantages can be achieved by virtue of the fact that, as in the present case, the vacuum cleaner has two conveying ducts 33, 34 which can be switched independently of one another into suction operation and into flushing operation, the conveying duct 33 opening into the conveying opening 17 of the subspace 27, and the conveying duct 34 opening into the conveying opening 17 of the subspace 28. There is a substantially fluid-tight connection from the respective subspace 27, 28 to the respective conveying duct 33, 34, with the result that, for example, the conveying duct 33 can be operated in suction operation, in order to convey a suction air flow via the subspace 27. At the same time, the conveying duct 34 can be operated in flushing operation, in order to convey a flushing air flow via the subspace 28. By, as described above, the deflecting surfaces 20 separating the subspaces 27, 28 from one another in a substantially fluid-tight manner, that half of the filter element 13 which is assigned to the subspace 28 can be cleaned in this case, while suction operation is still possible via that other half of the filter element 13 which is assigned to the subspace 27. As a result of the independent switching capability, the function of the conveying ducts 33, 34 can subsequently be swapped, with the result that flushing operation can take place via the conveying duct 33 and suction operation can take place via the conveying duct 34.

The invention claimed is:

1. A vacuum cleaner, comprising:
    a filter element disposed in the vacuum cleaner, the filter element including an upper side and a lower side which lies opposite the upper side;
    the filter element including a filter body extending from the upper side to the lower side and forming a wall of a clean air space situated between the upper side and the lower side;
    the filter element including a conveying opening arranged on the upper side into the clean air space, the vacuum cleaner driving an air flow through the conveying opening in a first direction for flushing the filter body and a second direction opposite the first direction for suction;
    the filter element including a deflecting surface extending from the upper side to the lower side in the clean air space, the deflecting surface being inclined relative to the wall of the clean air space to deflect the air flow in the first direction through the conveying opening toward the wall of the clean air space to flush the filter body;
    the deflecting surface forming a lower boundary of the clean air space with the wall of the clean air space, wherein the deflecting surface is configured to divide the clean air space into two subspaces which are separated from one another in a fluid-tight manner;
    a longitudinal beam element is disposed at the upper side, and an upper end of the deflecting surface is attached to the longitudinal beam element; and the filter element including a wall element adjacent to the wall of the clean air space, the deflecting surface including a lower end attached to a lower end of the wall element.

2. The vacuum cleaner as claimed in claim 1, wherein the vacuum cleaner includes a conveying duct, which can be switched in the first direction for flushing the filter body and the second direction opposite the first direction for suction, the conveying duct being connected to the conveying opening.

3. The vacuum cleaner as claimed in claim 1, wherein the deflecting surface reduces the size of the clean air space by more than 25%.

4. The vacuum cleaner as claimed in claim 1, wherein the deflecting surface reduces the clean air space by more than 35%.

5. The vacuum cleaner as claimed in claim 1, wherein spacing of the deflecting surface from the wall of the clean air space decreases continuously from the upper side to the lower side.

6. The vacuum cleaner as claimed in claim 1, wherein the deflecting surface encloses an angle with a vertical axis of the filter element between 30° and 60°.

7. The vacuum cleaner as claimed in claim 1, wherein the deflecting surface encloses an angle with a vertical axis of the filter element between 40° and 50°.

8. The vacuum cleaner as claimed in claim 1, wherein the wall of the clean air space is of substantially cylindrical configuration.

9. The vacuum cleaner as claimed in claim 1, and further comprising a supporting frame for holding the filter body and the deflecting surface being connected to the supporting frame.

10. The vacuum cleaner as claimed in claim 9, wherein the supporting frame has a top element which forms the upper side and a bottom element which forms the lower side.

11. The vacuum cleaner as claimed in claim 10, wherein the longitudinal beam element is attached to the top element.

12. The vacuum cleaner as claimed in claim 10, wherein the top element and the bottom element are connected to one another by the wall element.

* * * * *